J. HARRIS.
WIRE FENCE MAKING MACHINE.
APPLICATION FILED MAY 23, 1906. RENEWED MAY 9, 1908.

907,595.

Patented Dec. 22, 1908.
6 SHEETS—SHEET 1.

J. HARRIS.
WIRE FENCE MAKING MACHINE.
APPLICATION FILED MAY 23, 1906. RENEWED MAY 9, 1908.

907,595.

Patented Dec. 22, 1908.
6 SHEETS—SHEET 3.

J. HARRIS.
WIRE FENCE MAKING MACHINE.
APPLICATION FILED MAY 23, 1906. RENEWED MAY 9, 1908.

907,595.

Patented Dec. 22, 1908.
6 SHEETS—SHEET 4.

UNITED STATES PATENT OFFICE.

JONATHAN HARRIS, OF ASHTABULA, OHIO.

WIRE-FENCE-MAKING MACHINE.

No. 907,595.          Specification of Letters Patent.          Patented Dec. 22, 1908.

Application filed May 23, 1906, Serial No. 318,399. Renewed May 9, 1908. Serial No. 431,854.

*To all whom it may concern:*

Be it known that I, JONATHAN HARRIS, a citizen of the United States, and resident of Ashtabula, county of Ashtabula, State of Ohio, have invented certain new and useful Improvements in Automatic Wire-Fence-Making Machines, of which I hereby declare the following to be a full, clear, and exact description, such as will enable others skilled in the art to which it appertains to make and use the same.

The objects of the invention are to provide automatically operating mechanism or instrumentalities, to construct wire fencing or analogous products having line or horizontal wires of any desired number and vertical or stay wires cut to the predetermined height of the fencing.

Further objects are to provide an automatic machine, by means of which the wire fencing can be continuously constructed of line or stay wires, and formed into a roll of any desired number of rods in length, all ready for sale and delivery and ready to be stretched upon the posts planted to receive it.

The invention consists in the combination and arrangement in one organized device, of instrumentalities for accomplishing the following enumerated functions. For feeding the parallel line wires at intervals regulated to accommodate the intervals of spacing of the stay wires; for feeding a wire transversely to the line wires, and for cutting it off to form a stay wire, and continuing the feeding of the transverse wire, at intervals corresponding to the periods of stopping the feed of the line wires, and thus provide a continuous series of stay wires spaced at regular intervals; for winding the extremities of each stay wire about the outer line wires; for attaching each stay wire in turn to the line wires, by means of a molten metal joint at the points of crossing of the wires; for crimping the line wires on one plane to provide them with elasticity; and for winding the completed fence into a roll ready for shipment and for placing a tension upon the same.

The invention has also reference to mechanism for straightening the transverse or stay wire, to sectional dies for inclosing the crossing wires at the time a casting is being made, to means for reciprocating the lower die sections to alternately inclose and release the wires, and to instrumentalities for storing, melting and feeding the metal to the dies.

The invention has such further features of use, and advantage, and consists in the combination and operation of parts, and construction of the various details, as are hereinafter described, shown in the accompanying drawings, and specifically pointed out in the claims.

In the accompanying drawings, Fig. 2 also shows the receptacle for gas by means of which the metal supplied to the dies is heated, the melting box, one of the receptacles in which the metal in the form of balls is stored for use, and the feeding device therefor.

It also shows a plan view of the revoluble and sectional wire straighteners for the line wires; Fig. 8ª is a rear view of a winder showing wire guide and the cutting off knives, for the stay wire, at one side of the machine; Fig. 8ᵇ is a plan view thereof; Fig. 16 is an elevation of a stay wire and short portions of line wires secured together showing the appearance of the completed fencing.

In these views 1, 1, are side frames secured together by means of the lower bar or stretcher 2, and upper plate 3, 4 and 5 are pinion and main gear respectively by means of which the main operating shaft 6 of the machine is driven.

7 is a driving band wheel upon the shaft 8 of the pinion.

Figure 6:
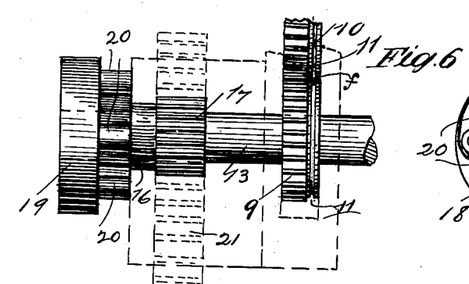
Fig. 6 is a side elevation of a portion of the shaft on which the lower set of feeding rollers for the line wires are mounted. It also shows the ratchet feed device, and the feed rack in dotted lines.
Figure 7:
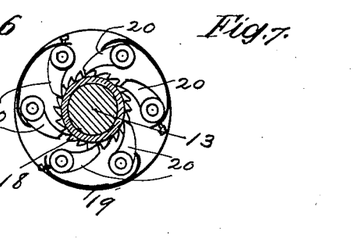
Fig. 7 is a face view of the terminal disk, and the pawl and ratchet device for this shaft is shown in transverse section.

Upon the main shaft 6 are placed the cams which control the movements of all parts of the machine. The first movement is that of the geared feeding rollers 9 and 10, which are provided each with a groove 11, in which a line wire $f'$ is inclosed, and with engaging teeth. These rollers are mounted in suitable boxes 12 which can be shifted along the shaft 13 which operates the lower rollers; The boxes are movably attached to the supporting bar 14 by means of set screws 15. The upper rollers are adjustable by means of set screws 15ª. This shaft operates all the rollers simultaneously and is rotated to feed the wire at predetermined intervals by means of the pawl and ratchet device shown in Figs. 6 and 7, and by means of cams 22 upon the main shaft 6 in the following manner, upon the shaft 13 is shown a sleeve 16, having a pinion 17 and a ratchet 18. A fixed disk 19 upon the outer end of the shaft 13 is provided with six spring pressed pawls 20, so arranged that only two pawls are in engagement with the ratchet at any one time. The advantage of which is that the slack movement of the pawls is limited to only one third of a tooth in space and hence amounts to very little in practice. Hence the feed is positive and slipping or inequality of feed is reduced to the minimum. A rack 21 engages the pinion 17 and is engaged by the cam 22 upon the main shaft. This structure is duplicated at each end of the machine since the power required to feed the heavy wires is considerable. The next movement which may however be a simultaneous one is the movement of the similar rollers 23 and 24 at one side of the machine to feed the stay wire $y$ across the line wires. This is accomplished by means of the rack 25 and pinion 26 mounted upon an auxiliary shaft 27. Upon this shaft is mounted the ratchet 28, and gear 29 having pawls 30 pivoted thereon, similar in all respects to the device shown in Fig. 7. The shaft 31 of the lower geared roller is provided with a pinion 32 engaging the gear 29. The rack 25 is reciprocated by means of the cam 33 upon the main shaft 6 and a suitable bracket 34 or support is employed upon which the shafts 27 and 31 are mounted. By this means the stay wire is fed underneath all the line wires, and projects slightly at either end beyond the outer line wires, and these ends are finally wound upon the line wires as described hereinafter. A hand lever 35 can be used when desired to rotate the feed rollers in case the wire becomes fouled. The line and stay wires are fed across the die bar 36, and in a longitudinal slot 37 therein the lower die sections 38 are secured. The wires rest upon these die sections in grooves 39 and 40, the stay wire below the line wire. The die bar 36 is raised with the die sections and wires therein to meet the stationary upper die sections 41, which are arranged in connection with the casting device and metal feeding device upon a rigid transverse bar 42. A cam 43 at each end of the shaft 6 lifts the bar 36 at regular intervals. To give an easy action to this cam and bar an intermediate block 44 having a curved surface 45 is interposed between the bar 36 and cam, 43, and this block is attached to a swinging arm 45 pivoted upon a rear shaft 46.

Figure 1:
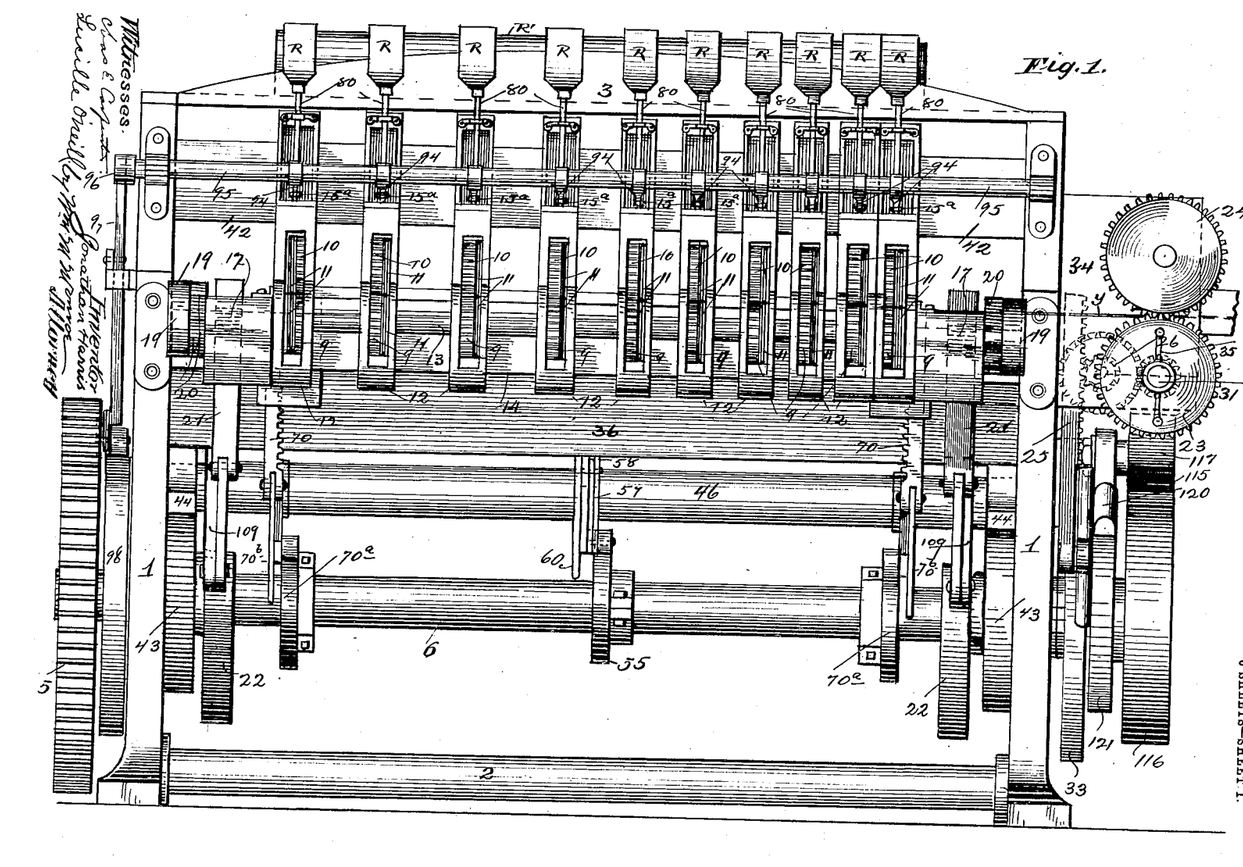
Figure 1 is a front elevation of the machine, showing the frame, the feed rollers for the line and stay wires, the main gear wheel, and operating shaft, the reciprocating and stationary die sections and the various cams upon the main shaft for operating respectively, the reciprocating die bar, the wire feeding devices, the belt tightener or friction device, and the device for storing and for feeding the metal to the dies. In this figure the main shaft is shown as the center of operation of the working parts of the machine.
Figure 2:
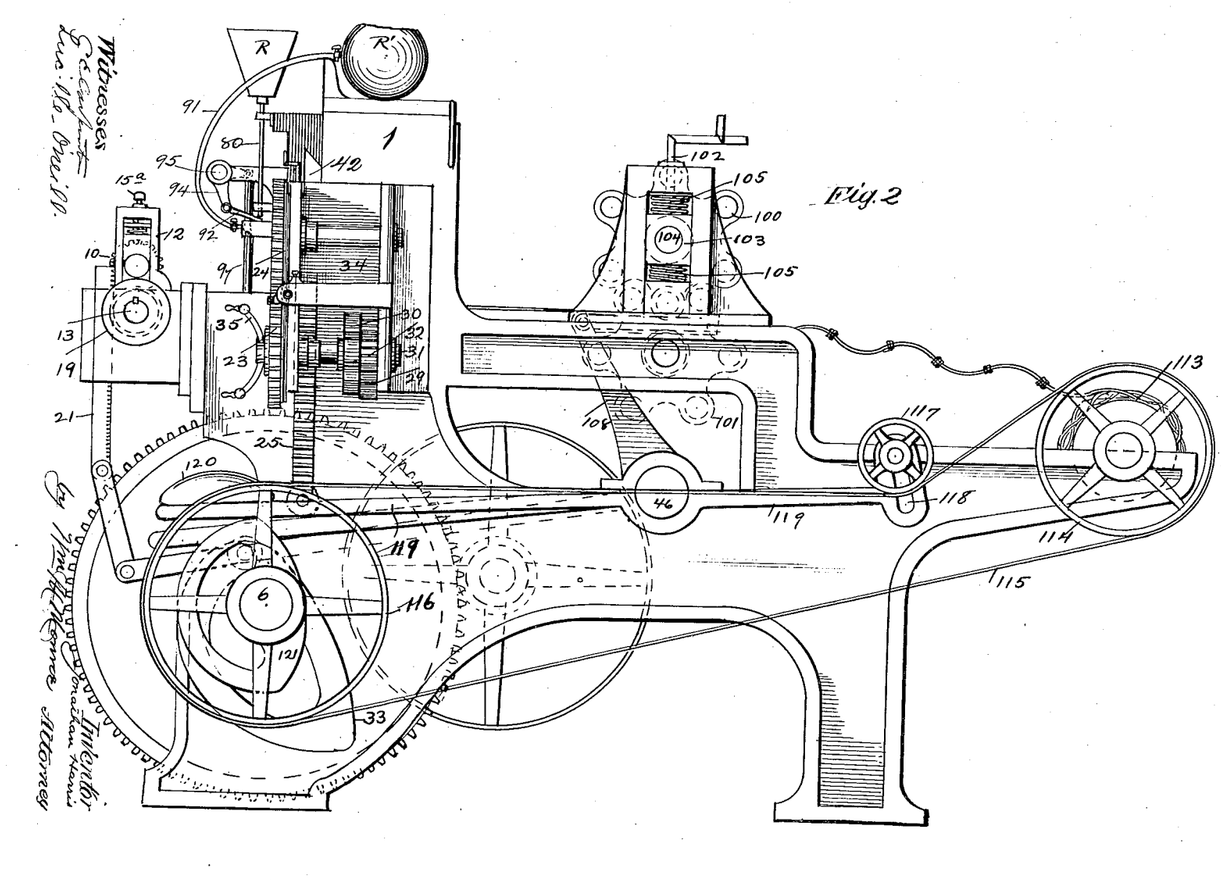
Fig. 2 is a side elevation showing the feeding rollers for the stay wire, the reel and automatic belt tightener, the cams for feeding the transverse or stay wire to the dies, and for operating the crimping device.
Figure 3:
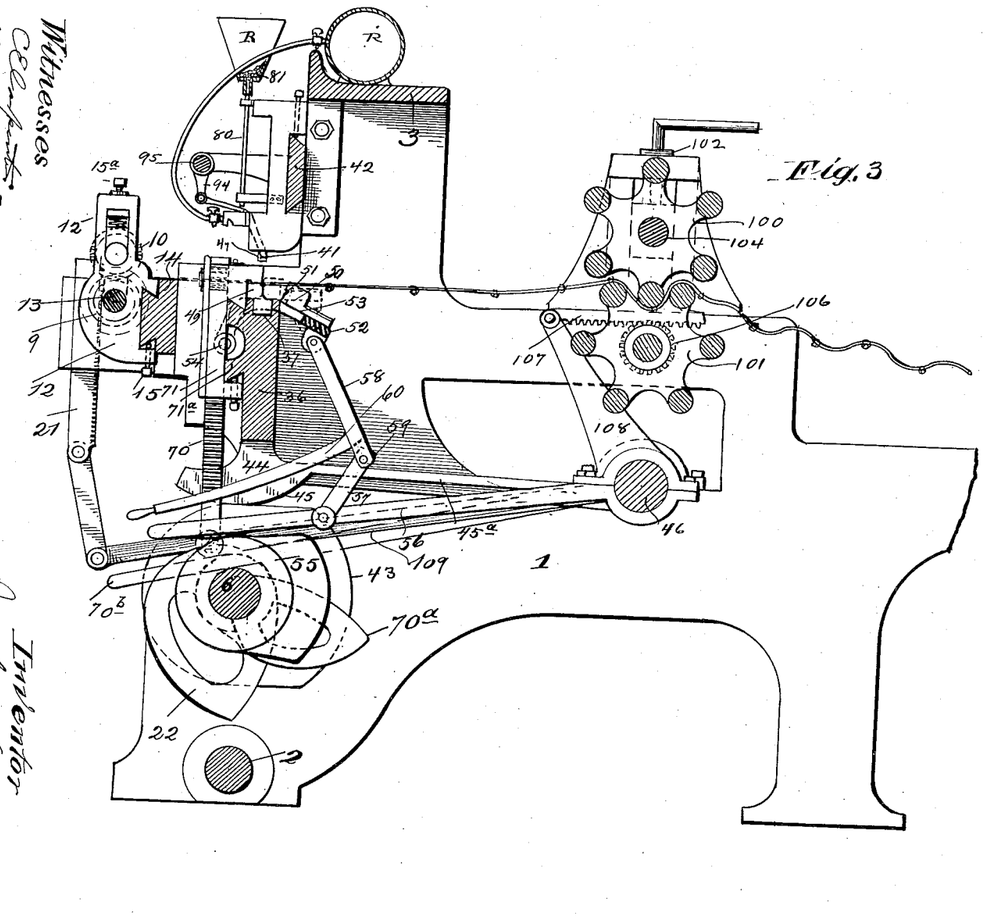
Fig. 3 is a central longitudinal section through the machine showing the main die bar and one of the operating cams therefor, one of the lower die sections, the pivoted back bar and its appendages and operating cam therefor, the feed rollers cases and rollers for one of the line wires, an operating cam and rack for said rollers, an operating cam and rack for one of the winders. The crimping rods are also shown in transverse section and the operating rack therefor.
Figure 4:
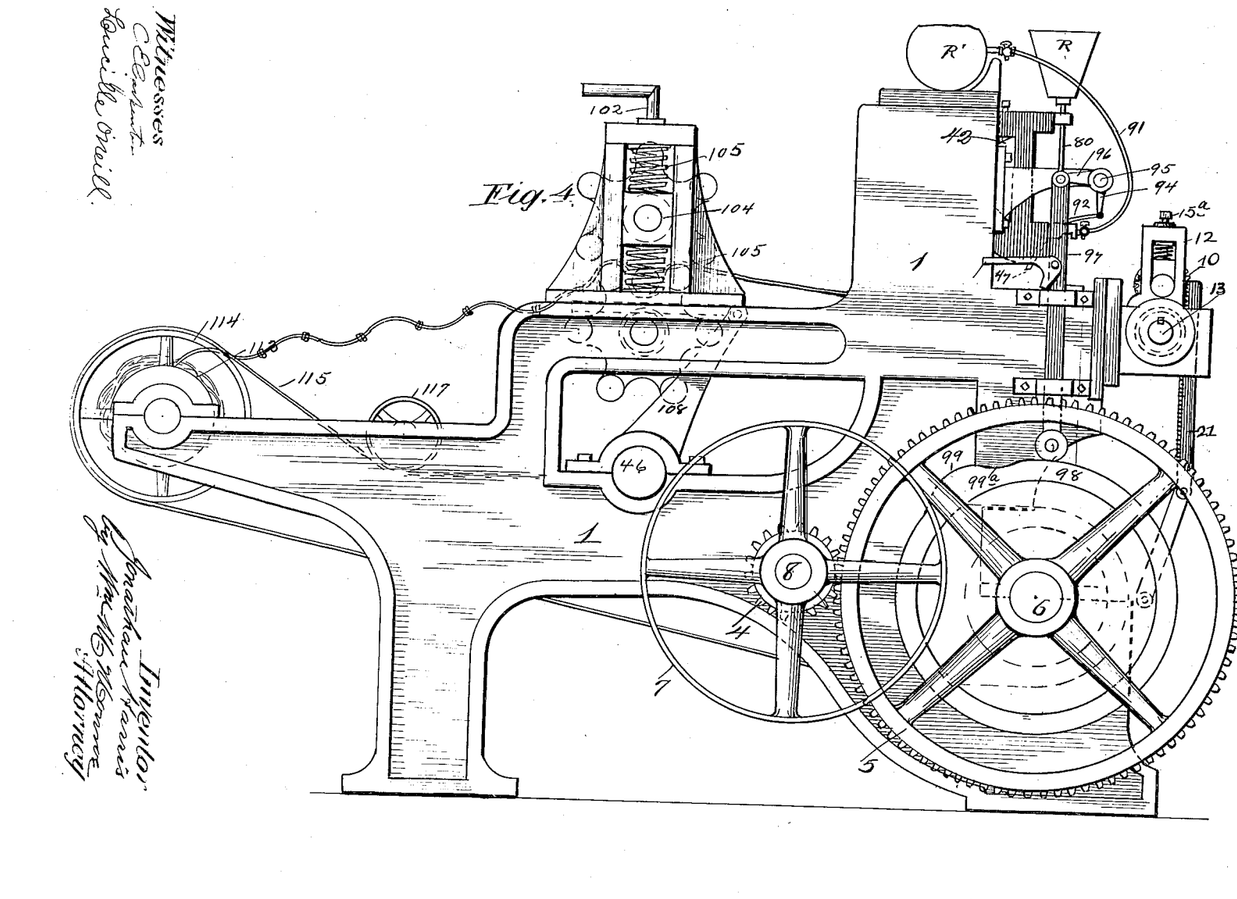
Fig. 4 is a side elevation of the side not shown in Fig. 2, and shows in addition to other features shown in Fig. 2 the cam and operating device for the metal feed finger, the drive band wheel and driving pinion, and main gear wheel.

Cutting bars 47 and 48 mounted respectively upon the moving bar 36 and upon rigid supports above the bar sever the stay wire as it is raised, and the stay wire is then rigidly secured from moving while the wires are attached together by means of rigid blocks 49 secured in the groove in the bar 36, between the die sections, and movable retaining blocks 50 having grooved edges 51 which inclose the stay wire, and abut against the stationary blocks when closed. These retaining blocks are attached to a movable back bar 52 which swings upon arms 53 pivoted at 54 to the sides of the frame 36. This back bar is swung back from contact with the stay wire until the bar 36 rises, then it is moved forward to secure the wire and hold it rigidly until the crossing wires are united. This is accomplished by means of the cam 55, the intermediate arm 56 swinging upon the shaft 46, and links 57 and 58. One of these links has a shoulder 59 and the other a handle or lever 60 adapted to lock with the shoulder. By grasping the handle and lowering it into the position shown in Fig. 4 the wire can be released at any time if it becomes lodged or fouled, so as to become imperfect, and can be removed. Then by turning the handle 35 by hand a new wire can be fed into the machine.

Figures 8, 8A, 8B, 9, 10, 11, 12, 13, 14, 15, 16:
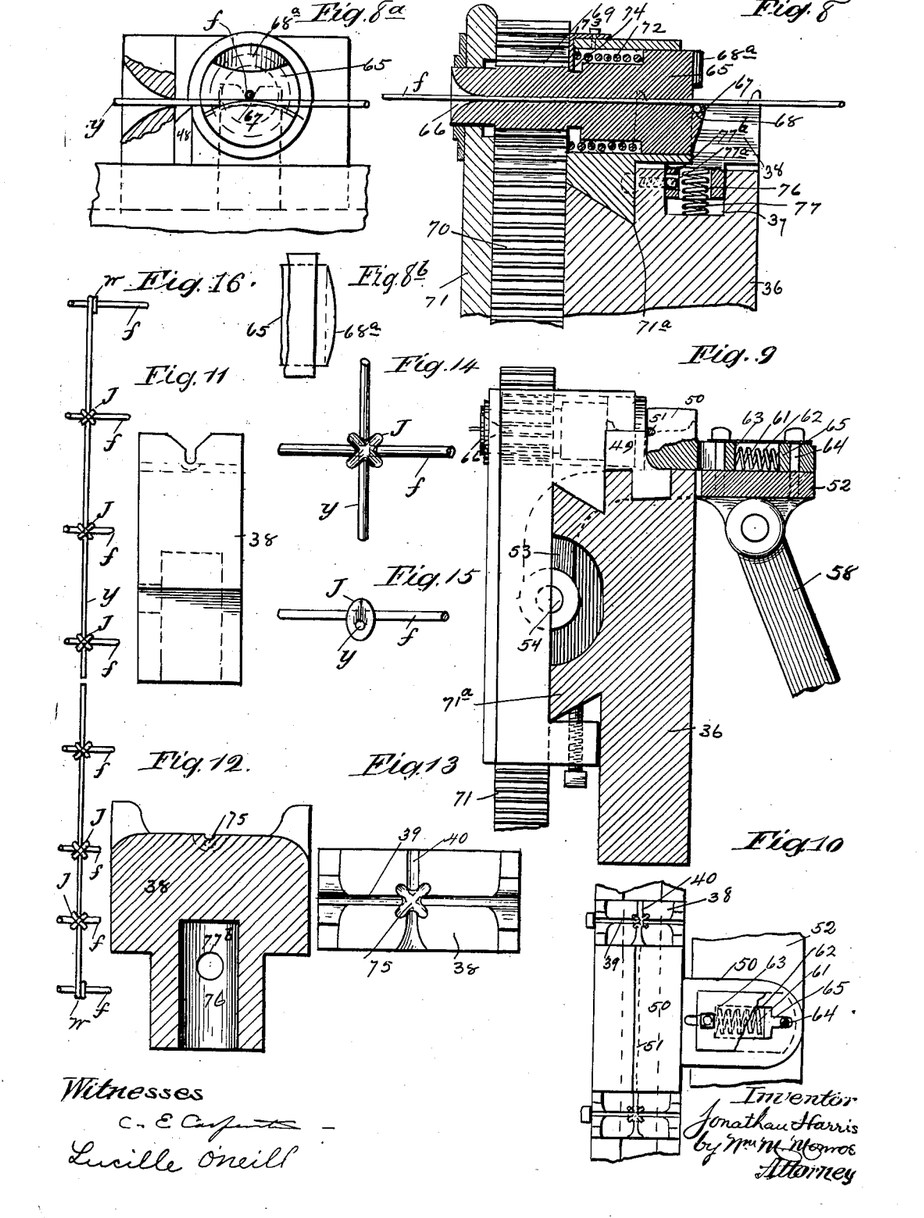
Fig. 8 is a vertical central section through one of the winders, showing the rack and pinion therefor.
Fig. 9 is a transverse section through the reciprocating die bar showing the back bar, and a wire holder, and the movable block upon the bar in which the winder is mounted.
Fig. 10 is a plan view of a portion of the die bar showing lower die sections and a portion of the back bar and wire holder.
Fig. 11 is an end view of a lower die section.
Fig. 12 is a transverse section therethrough.
Fig. 13 is a plan view thereof.
Fig. 14 is a plan view of a wire crossing showing the completed cast metal tie thereon.
Fig. 15 is an edge view thereof.
Fig. 16 is a longitudinal central section through the casting box, and burner for gas, showing mixing chamber and orifices for flame, or products of combustion, leading to the melting plate. In this view is also shown the funnel leading to one of the lower die sections, and the upper die section recessed in the lower end of the funnel.

In Figs. 9 and 10 the retaining blocks 50 are shown to be held under tension upon the back bar by means of the springs 61, set in slots 62 in the blocks, and operating against a shoulder 63 in each block and a bolt 64 in the back bar; a thrust piece 65 receives the pressure at one end of the spring.

While in position in the dies and retaining blocks the projecting ends of the stay wire are wrapped around the outer line wires at $w$ by means of the following instrumentalities. 65, 65 are short cylindrical winder shafts, through an opening 66 in the center of each of which the outer line wire is threaded. The inner face of each winder 65, is provided with a projection 67 having a groove 68 which normally lies horizontal and receives the extremity of the line wire, as shown in Figs. 8 and $8^a$. As soon as the knives cut off the wire, the winder shaft rotates by means of the pinion 69 thereon and a rack 70 moving in the casing 71 in which the winder shaft is mounted. This casing is adjustably secured to the V guide 71 upon the front of the die bar 36 and moves therewith. The rack is reciprocated by means of the cam $70^a$ upon the main shaft, and swinging bar $70^b$. As the winder revolves about the line wire the groove carries the end of the stay wire also about it, and the pressure of each strand upon the adjacent strand already wound and the pressure of the cam surface $68^a$ upon the face of the winder, will force back the winder against the internal spring 72, and permit the strands to lie closely together and to lie smoothly and regularly upon the line wire until the back bar is removed, the die bar lowered and the fencing drawn back, when the spring will be released and the winder will spring back to its former position. A keeper 73 entering an annular slot 74 in the winder shaft prevents the shaft from retiring farther than desired.

The lower die sections are plainly shown in Figs. 11, 12 and 13, and are shown to have a recessed central cavity 75 suited to molding the form of joint shown in Figs. 14 and 15 about the wire crossings. That is in connection with the upper die sections.

A central opening 76 contains a spring 77 (shown in Fig. 8) which gives elasticity to the section, and permits the die sections to be retained in very close contact until the casting is made. A pin or screw $77^a$ entering a larger opening $77^b$ prevents the section from coming off from the bar.

It is obvious that the mechanism already described can be employed in connection with making wire fencing having a wire or metal tie of any sort and in which dies are employed to attach the parts together. I employ however upper and lower dies in the form of molds, in which conjointly a metal tie or joint is cast about the crossing wires and hence employ the specific forms of dies, and instrumentalities for feeding and melting the metal and for supplying it to the dies in exact predetermined quantities to fill the molds, that will now be described. The upper dies are all alike, and contain recesses 79 corresponding to the upper portion of the mold, as seen in Fig. 16 where the mold or die sections are brought together to inclose the crossing wires.

The fingers are all mounted upon rock arms 94 upon a transverse shaft 95 in front of the machine, and are simultaneously operated by means of the rock arm 96 and 97 and cam 98 (see Fig. 4) which is provided with a raised portion 99 to give the long movement to the arm, and with a slight recess $99^a$ to give the short return movement which releases a ball and instantly returns the finger to guard the opening and retain the other balls. The tubes 80 are moved up and down by the finger 92 and keep stirring up the balls 81. A cam shaped lever L pivoted upon the rod 97 serves to lift the rod out of contact with the cam 99 when it is desired to stop the casting device from operating for any reason. A large reservoir R for balls, and a reservoir R' for compressed gas are shown in the figures.

An important feature of the invention is found in the reels 100 and 101 between the rods of which the completed fence passes, and by means of which the line wires are crimped to permit of some elasticity in the fence. The upper reel is vertically adjustable by means of screws 102, and the bearing 103 and shaft 104 are supported upon springs 105 so that the strain will not be a breaking one. The lower reel is revolved by means of a pinion 106 loose upon the reel shaft, and a rack 107, operated by a rock arm 108 upon the shaft 46. A longer arm 109 to which the arm is secured projects forward and is operated by means of a cam 22, upon the main shaft 6 of the machine, which also operates the rack 21 and front feed rollers, so that the movements will be simultaneous. A ratchet 111 and pawls 112 upon the pinion 106 operate the reel shaft in precisely the same manner as the ratchet devices for feeding the wire, shown in Figs. 6 and 7 thus giving regular movement without slipping. These ratchets being alike an illustration of one serves for all of them. The drum 113 upon which the completed fence is wound is driven by a band wheel 114 upon the drum shaft, and by a belt 115 passing over a band wheel 116 upon the shaft 6. To obtain increased tension at the time of winding and to insure a tight roll the belt 115 is passed underneath an idler 117, which is adjustably mounted in a slot 118, in an arm 119 which pivots upon the shaft, 46, and its forward end is heavily weighted at 120 and its movement controlled by means of a cam 121 upon the main shaft 6. This cam is constructed to depress the idler and tighten the belt in such a manner as to apply tension upon the drum while the coil of fence is being wound.

Figure 5:
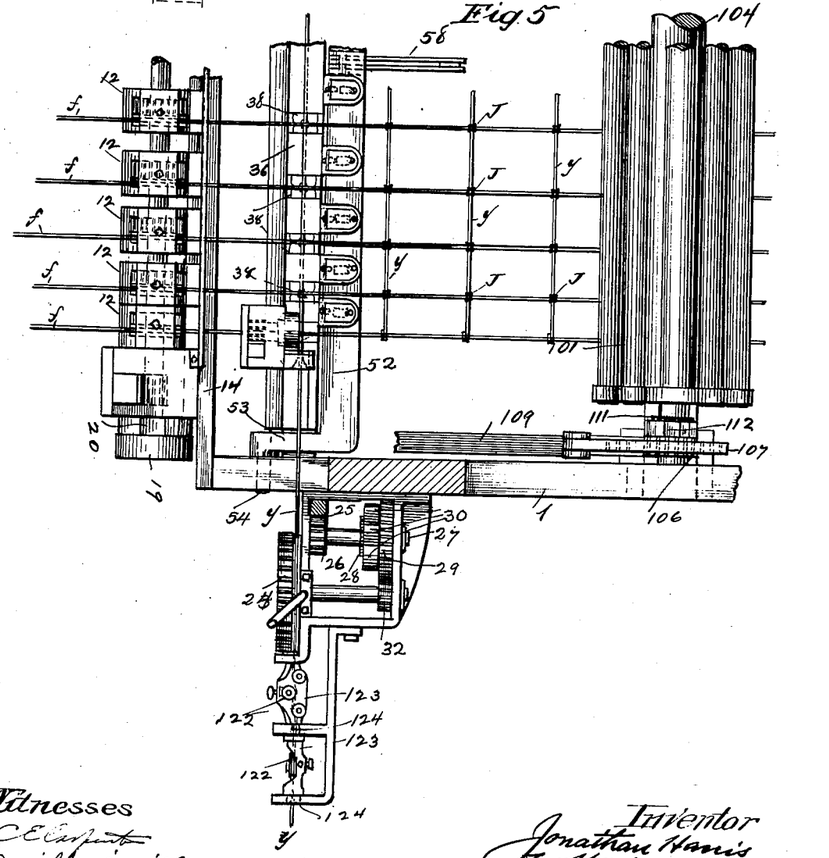
Fig. 5 is a plan view of reciprocating die bar upon which the lower die sections rest, it also shows the feed rolls for line and stay wires, one of the winders, the back bar and wire holders between the lower die sections, a portion of the wire crimping device, and one of the wire cutters.

A wire straightener is shown clearly in Fig. 5 for the stay wire, and the grooved rollers 112 are mounted upon bars 123 adjustable upon their longitudinal axes and their extremities are pivoted at 124 in a bracket in such a manner that they can be rotated so as to take the curve out of the wire which has been formed therein by previous coiling. This produces a perfectly straight stay wire, and the straighteners can be turned on their axes to straighten out the wire in whatever direction it may be curved.

In operation of the machine, the cam 98 which feeds the metal balls to the heater operates just as the molds are closing and the scraper pushes the metal into them. Each finger separates one ball from the receptacle, and shoves in the melted metal at that time. The cam 43 which raises and lowers the lower die or mold bar 36, closes the molds during one third of its revolution and at the same time cuts off the stay wire. As this bar lowers, the cam 55 which operates the back bar 52, withdraws the bar 52 and permits the fencing to move out, and immediately closes the back bar, at the same time the cross feed rollers are operated by cam 33 to feed a new stay wire into the machine. As soon as the cross feed is accomplished and the stay wire cut, the winders operated by the cam 70ª wind the ends of the stay wire y about the outer line wires. When the lower mold bar is down and the stay wire is feeding in, the cams 22, 22 operate the front feed rollers 9 and 10 and feed the line wires, the required distance, to properly space the stay wires thereon.

A feature of the invention as shown in the drawings is the separate adjustability of each upper geared feed roller, for the line or strand wires, upon an individual shaft, as shown in the drawings. The purpose of this separate adjustment is found in the facility with which any one of the upper rollers can be lifted out of engagement with its corresponding lower roller. This permits of the introduction of a new wire between the upper and lower rollers of any pair, in case one wire should run out before the others, or if one wire should break or be imperfect, and a new one must be substituted therefor. Moreover, it is invariably the case that no two reels of wire will be of exactly the same length and come to an end at the same time. For this reason it is necessary that each upper roller should be pivoted upon a separate shaft, and should be separately adjustable from any of the others. The upper roller in each pair is therefore practically an idler and the lower rollers are all operated in unison.

Heretofore it is well known that one or the other of one pair of feed rollers has been adjustable in order to take out what is left of a roll of wire and to insert a new wire, or a series of rollers has been made adjustable as a whole in relation to a corresponding series of rollers, said rollers operating in pairs to feed the wires. I believe myself, however, to be the first to provide a feed device for a wire fence making machine in which one set or series of rollers are secured upon a common shaft, and the rollers of the series which engage therewith are each mounted upon a separately adjustable shaft so that only one roller at a time need be adjusted, and the others can remain closed or unchanged.

The manner of operating the various racks by means of the intervening pivoted arms or bars is useful in affording greater freedom in placing the racks, since they need not then be vertically located over the cam shaft.

Having described the invention what I claim as new and desire to secure by Letters Patent is:—

1. The combination in a machine for making wire fencing comprising line and stay wires, of a frame, upper fixed mold sections therein, spaced to accommodate the wire spacing of the fencing, a reciprocating bar and lower mold sections thereon, corresponding to the fixed mold sections, instrumentalities comprising geared and grooved rollers, for feeding the line wires, similar geared rollers for feeding a transverse wire between the mold sections, means for cutting the stay wires one at a time from the transverse wire, mechanism constructed and arranged to wind the extremities of each stay wire about the outer line wires, means for supplying the molds when closed together with fluid metal, means for rigidly securing the stay wire in place while the molds are being filled, means for releasing the said securing means when the wires are attached together, a crimping device consisting of reels having intermeshing members, and means for coiling the finished fencing into a roll, a main actuating shaft for the aforesaid instrumentalities, a series of cams on said shaft, and intervening mechanism between said cams and said aforesaid operating means whereby said movements are controlled by said cams, substantially as described.

2. The combination in a machine for making wire fencing having line and stay wires attached together, of side frames, a vertically reciprocating bar therein, a series of lower mold sections adjustably secured to said bar, means for reciprocating the same, a transverse bar at the upper edge of the machine, a series of mold sections secured thereto, a metal heating device having a tube arranged to discharge fluid metal into the upper molds, a melting plate in the heating device having a cavity, and a groove leading therefrom to the said tube, a tubular reservoir containing metal portions of predetermined volume equal to the mold capacity, a finger adapted and arranged to liberate one metal portion at a time from the receptacle to fall upon the melting plate, instrumentalities for moving said finger to release said metal portion and push the same when melted into the tube leading to the upper mold, the said movement occurring simultaneously with the raising of the lower mold sections to close the molds, and means for feeding the line and stay wires to the molds, prior to introducing the metal thereto, and means for removing the completed fencing, substantially as described.

3. In a machine for making wire fencing having line and stay wires, mechanism for feeding the line wires and completed fence, comprising front feed rollers, and a pair of reels having crimping members, between which the line wires pass, a drum upon which the completed fencing is wound, a shaft for said geared rolls, a shaft for said reels, a pawl and ratchet device for each shaft having a numerically greater number of teeth than pawls, mechanism for operating said front feed rollers and reels conjointly, a shaft for the drum and means for rotating said drum and for placing a tension thereon, substantially as described.

4. In a wire fence making machine, the combination with rotating wire feeding devices, of a shaft for each rotating device, a ratchet loosely mounted upon the shaft and operating pawls therefor, the pawls being less in number than the teeth of the ratchet for the purpose set forth, and springs adapted and arranged to retain said pawls in contact with said teeth and rotating means for the ratchet, substantially as described.

5. In a wire fence making machine, having a frame a main operating shaft and a winding drum and shaft for the complete fencing, in combination, means for operating the same, consisting of a band wheel upon the drum, a band wheel upon the main shaft, a belt upon said wheels, and a belt tightening device arranged to act at predetermined intervals, comprising an arm pivoted upon the frame, an idler at one end thereof, a weight at the other end, and an operating cam therefor, on the main shaft of the machine, substantially as described.

6. In an automatic machine for making wire fencing, said fencing consisting of line and stay wires, said stay wires having their ends wound about the outer line wires, and said stay wires secured to the remaining line wires at their points of crossing, mechanism for feeding the line and stay wires, means for cutting off each stay wire so that its ends project beyond the outer line wires and means for winding the projecting ends of the stay wire about the outer line wires, consisting of cylindrical members through which said line wires pass bearings for said cylindrical members in which they are free to move longitudinally, tension springs in said bearings, a shoulder and groove upon the inner end of each cylinder, adapted to engage the projecting stay wires, and means for rotating said cylindrical members, arranged to operate subsequently to the wire feeding devices for line and stay wires, substantially as described.

7. The combination with a bearing, of a cylindrical winding device, having a pinion thereon, and a central opening, and a transverse groove on its inner face, said groove opening upwardly when at rest, and said winding device longitudinally movable in said bearing, a tension spring in said bearing operating against said cylindrical device, and a stop finger upon the bearing to prevent excessive movement of the winding device, substantially as described.

8. In a machine for making a wire fence composed of line and stay wires, a sectional wire straightener for the stay wire consisting of the combination of adjustable bars, having pivotal points of support on their linear axes, a bracket in which the bars are supported on a common axis, and straightening rollers upon said bars, substantially as described.

9. In a machine for making wire fencing, composed of line and stay wires, a feed device for the line wires, consisting of a pair of grooved rollers for each wire, a pair of engaged spur gears for each pair of rollers, a common operating shaft for one set of rollers, an individual shaft for each roller of the engaging set of rollers, a ratchet wheel loose upon the operating shaft, a disk rigidly secured upon the shaft, pawls, pivoted upon the disk and less in number than the teeth of the ratchet wheel, and arranged to engage therewith, a pinion operatively connected with the ratchet wheel, and a reciprocating rack engaging the pinion, the said pawls and ratchets operating the rollers to feed the wire forward into the machine, at predetermined intervals.

10. A wire feeding device for an automatic wire fence making machine having a main operating shaft, comprising in combination therewith, a series of grooved rollers a common shaft upon which said rollers are mounted, a corresponding series of rollers, individual shafts for said corresponding rollers, engaging gears for each pair of rollers, and means for rotating said rollers to feed the wire at predetermined intervals, consisting of a cam upon the said main operating shaft, a rack operated thereby, a sleeve loose upon the said common feed roller shaft, a pinion and ratchet wheel thereon, said pinion arranged to engage with said rack, and spring pressed pawls operatively connected with said common feed roller shaft, and arranged to engage said ratchet wheel, substantially as described.

11. In an automatic wire fence making machine, a wire feeding device for the line wires of the fence, comprising, in combination, a series of feed rollers, a common connecting shaft by means of which said series of rollers are conjointly operated, a series of independent rollers adapted to severally engage the said connected rollers, and means for separately adjusting each independent roller, whereby each independent roller can individually be thrown into or out of engagement with the corresponding roller of the series of connected rollers, substantially as described.

12. In an automatic machine for making wire fencing, or analogous products, a wire feeding device for the line wires, consisting of, in combination, a series of grooved rollers, a common connecting shaft therefor, by means of which said rollers are rotated in unison, a series of independent grooved rollers adapted to severally engage said connected rollers, an independently adjustable shaft for each independent roller, gears on the faces of each pair of rollers, a series of boxes in which each pair of rollers is inclosed and through which said common shaft passes, adjustable bearings in each box for each independent shaft, and a support for each box, substantially as described.

13. In an automatic machine for making wire fence, having side frames, a transverse bar thereon, and a main operating shaft, the combination therewith of a common roller shaft mounted upon said bar, a series of feed rollers for the line wires, rigidly secured upon said common shaft to move in unison, a series of independent rollers adapted to engage severally therewith, an individual shaft for each independent roller, adjustable bearings, for each individual shaft, upon said bar, separate means for rotating each pair of rollers, and means operatively connected with said main operating shaft for rotating said common roller shaft to feed the wires through a predetermined interval, substantially as described.

In testimony whereof I hereunto set my hand this 5th day of May, 1906.

JONATHAN HARRIS.

Witnesses:
 WM. M. MONROE,
 GEO. S. COLE.